(12) United States Patent
Huber et al.

(10) Patent No.: US 10,611,398 B2
(45) Date of Patent: Apr. 7, 2020

(54) STEERING COLUMN FOR A MOTOR VEHICLE

(71) Applicants: THYSSENKRUPP PRESTA AG, Eschen (LI); thyssenkrupp AG, Essen (DE)

(72) Inventors: Sebastian Huber, Göfis (AT); Christoph Munding, Eschen (LI); Sebastian Forte, Mauren (LI)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 150 days.

(21) Appl. No.: 15/778,992

(22) PCT Filed: Dec. 1, 2016

(86) PCT No.: PCT/EP2016/079448
§ 371 (c)(1),
(2) Date: May 24, 2018

(87) PCT Pub. No.: WO2017/102358
PCT Pub. Date: Jun. 22, 2017

(65) Prior Publication Data
US 2018/0297626 A1    Oct. 18, 2018

(30) Foreign Application Priority Data
Dec. 18, 2015   (DE) .......................... 10 2015 225 907

(51) Int. Cl.
*B62D 1/19*   (2006.01)
(52) U.S. Cl.
CPC .................................. *B62D 1/192* (2013.01)

(58) Field of Classification Search
CPC ........ B62D 1/195; B62D 1/184; B62D 1/187; B62D 1/185; B62D 1/189; B62D 1/19; B62D 1/192
(Continued)

(56) References Cited

U.S. PATENT DOCUMENTS 3,811,337 A     5/1974  Allison
7,455,320 B2 *  11/2008 Imamura ................ B62D 1/195
                                                     280/777
(Continued)

FOREIGN PATENT DOCUMENTS

CN     1449958 A    10/2003
CN     2709274 Y    7/2005
(Continued)

OTHER PUBLICATIONS

English Translation of International Search Report issued in PCT/EP2016/079448, dated Feb. 3, 2017 (dated Feb. 13, 2017).

*Primary Examiner* — Ruth Ilan
*Assistant Examiner* — Hilary L Johns
(74) *Attorney, Agent, or Firm* — thyssenkrupp North America, Inc.

(57) ABSTRACT

A steering column may include an adjustment unit with a steering spindle mounted rotatably about its longitudinal axis in a casing tube, a support unit in which the adjustment unit is mounted so as to be adjustable along the longitudinal axis, and a stop device with a movably mounted stop element positionable in a blocking position and a release position. In the blocking position the stop element limits the adjustment travel of the adjustment unit relative to the support unit. In the release position, the stop element allows adjustability in the direction of the longitudinal axis beyond the adjustment travel limited in the blocking position. The stop device has an actuation body that has an inert mass, is actively connected to the stop element, and is mounted
(Continued)

movably relative to the support unit. In a crash event, the mass inertia of the actuation body causes it to interact with the stop element to move the stop element from the blocking position into the release position.

13 Claims, 4 Drawing Sheets

(58) Field of Classification Search
USPC .......................................................... 280/777
See application file for complete search history.

(56) References Cited

U.S. PATENT DOCUMENTS

| | | | |
|---|---|---|---|
| 2006/0181070 A1* | 8/2006 | Imamura | B62D 1/195 280/777 |
| 2010/0018340 A1* | 1/2010 | Schnitzer | B62D 1/192 74/493 |
| 2010/0282016 A1* | 11/2010 | Oehri | B62D 1/184 74/493 |
| 2010/0307280 A1* | 12/2010 | Schnitzer | B62D 1/185 74/493 |
| 2014/0020502 A1 | 1/2014 | Schnitzer | |
| 2014/0260762 A1* | 9/2014 | Streng | B62D 1/195 74/493 |
| 2015/0013493 A1* | 1/2015 | Back | B62D 1/195 74/493 |
| 2015/0047456 A1* | 2/2015 | Heitz | B29C 45/1671 74/492 |
| 2015/0135882 A1* | 5/2015 | Rauber | B62D 1/181 74/493 |
| 2015/0314801 A1* | 11/2015 | Gstohl | B62D 1/195 74/493 |
| 2015/0375767 A1* | 12/2015 | Agbor | B62D 1/181 74/493 |
| 2017/0137051 A1 | 5/2017 | Sawall | |

FOREIGN PATENT DOCUMENTS

| | | | | |
|---|---|---|---|---|
| DE | 3803401 A | 8/1989 | | |
| DE | 10 2007 002091 B | 7/2008 | | |
| DE | 10 2011 056351 A | 6/2013 | | |
| DE | 10 2014 016510 A | 2/2015 | | |
| DE | 102014016510 A1 * | 2/2015 | ............ | B62D 1/192 |
| DE | 10 2014 108577 B | 9/2015 | | |
| DE | 102014104191 B | 9/2015 | | |
| DE | 102014108577 B3 * | 9/2015 | ............ | B62D 1/187 |
| EP | 1854701 A | 11/2007 | | |
| EP | 1854701 A2 * | 11/2007 | ............ | B62D 1/195 |
| WO | 2015076226 A | 5/2015 | | |

* cited by examiner

STEERING COLUMN FOR A MOTOR VEHICLE

CROSS REFERENCE TO RELATED APPLICATIONS

This application is a U.S. National Stage Entry of International Patent Application Serial Number PCT/EP2016/079448, filed Dec. 1, 2016, which claims priority to German Patent Application No. DE 10 2015 225 907.2, filed Dec. 18, 2015, the entire contents of both of which are incorporated herein by reference.

FIELD

The present disclosure generally relates to steering columns, including adjustable steering columns for motor vehicles.

BACKGROUND

To adapt the steering wheel position to the seating position of the driver of a motor vehicle, steering columns are known in the prior art in which the steering wheel, mounted on the rear end of the steering spindle, can be positioned in the vehicle interior via a length adjustment in the direction of the steering column longitudinal axis.

The length adjustability is achieved in that the adjustment unit, which comprises the steering spindle mounted rotatably about the longitudinal axis in a casing tube, is displaceable telescopically in the longitudinal direction relative to the support unit, which forms a holder of the steering column connected fixedly to the vehicle body. By means of a releasable clamping device, the adjustment device can be secured, i.e. fixed releasably, in different length positions of the adjustment travel relative to the support unit, in order to lock the respective steering wheel position. A stop device ensures that in normal operation, the adjustment travel of the adjustment unit relative to the support unit is limited, in order to set the steering wheel position in the direction of the longitudinal axis. Here, a stop element, mounted on the support element and protruding into the passage cross-section of the adjustment unit, forms an end stop which the adjustment unit meets when it is moved longitudinally forward relative to the support unit, i.e. retracted, in relation to the direction of travel of the vehicle. In this way, the adjustment unit is blocked in the maximally retracted or shortened adjustment position, and cannot be moved further manually.

As an effective measure for improving occupant safety on a vehicle collision, known as a crash or vehicle frontal impact, in which the driver hits a steering wheel at high speed, it is known to configure the steering column so as to be collapsible in the longitudinal direction when a high force is exerted on the steering wheel which exceeds a limit value only occurring in a crash. In order to allow a controlled braking of a body hitting the steering wheel when the adjustment unit is in the maximally retracted or shortened adjustment position, i.e. in the end position limited by the stop element in the blocking position, it is known that the stop element is brought out of the blocking position into a release position in which the adjustment unit can be moved further in the direction of the longitudinal axis than the above-mentioned end position, i.e. can be retracted. In this way, an additional movement travel is provided for the adjustment unit which can be used for controlled energy absorption in the event of a crash.

A steering column with such a stop device is described for example in DE 10 2011 056 351 A1. This has a stop element which is connected to a control lever of a clamping device for fixing the adjustment unit in the support unit. In the open state of the clamping device, the stop element is in the blocking position so that the adjustment unit can be retracted forward only as far as the stop in order to set the steering wheel position. When the control lever is pivoted to fix the clamping device, the stop element is moved into the release position so that in the event of a crash, the adjustment unit can be moved further forward in the longitudinal direction. It is advantageous here that when the steering column is fixed, an extended adjustment travel is available for braking the adjustment unit. The disadvantage with the coupling of the stop element to the clamping device, however, is that then the additional adjustment travel is only released with certainty if the control lever has actually been pivoted sufficiently far. Also, the naturally frequent actuation of the clamping device entails actuation of the stop device each time, which can lead to wear and deterioration in function.

Thus a need exists for a steering column with improved actuation of a stop device.

DETAILED DESCRIPTION

Figure 1:
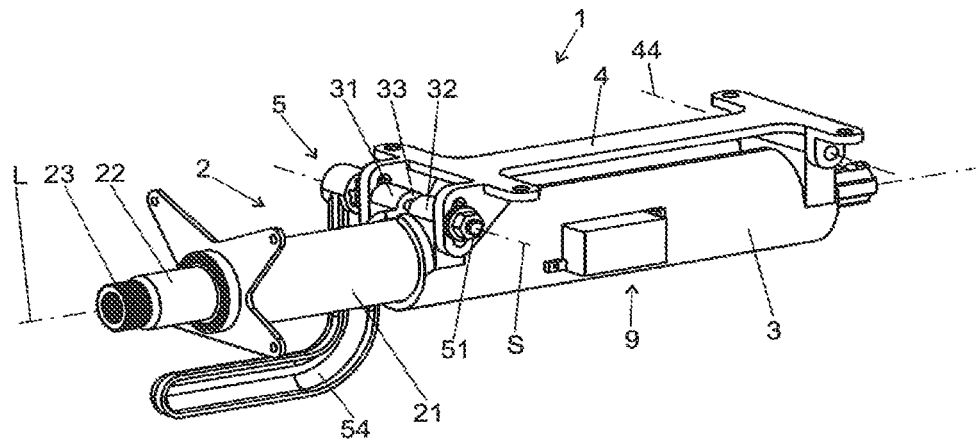
FIG. 1 is a diagrammatic, perspective view of an example steering column.
Figure 2:
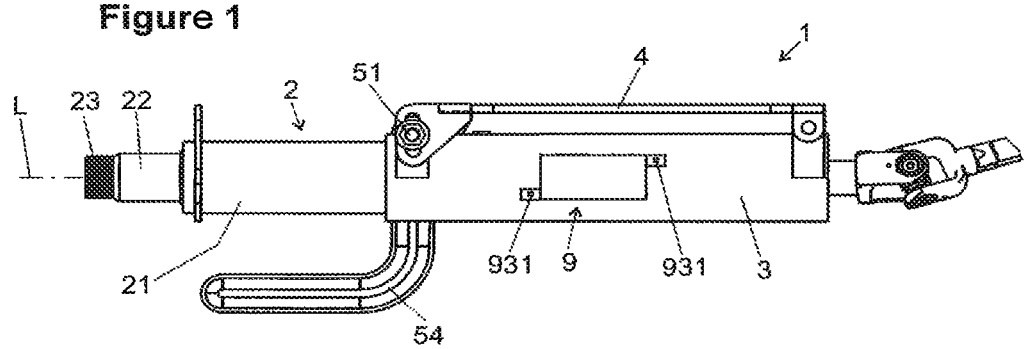
FIG. 2 is a side view of the example steering column of FIG. 1.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by 'at least one' or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

In some examples, a steering column for a motor vehicle may comprise an adjustment unit with a steering spindle mounted rotatably about its longitudinal axis in a casing tube, a support unit that is connectable to a body of the motor vehicle and in which the adjustment unit can be mounted so as to be adjustable in the direction of the longitudinal axis, and a stop device with a movably mounted stop element that can be brought into a blocking position or a release position. In the blocking position, the stop element limits the adjustment travel of the adjustment unit relative to the support unit. In the release position, the stop element allows the adjustability in a direction of the longitudinal axis beyond the adjustment travel that is limited in the blocking position.

In some examples, the stop device has an actuation body that has an inert mass, is actively connected to the stop element and is mounted movably relative to the support unit. In the event of a crash, the mass inertia of the actuation body causes the latter to interact with the stop element for movement of the stop element out of the blocking position into the release position.

In the invention, the actuation of the stop device to transfer the stop element from the blocking position to the release position takes place solely on the basis of the acceleration forces acting in a crash, or the resulting inertia forces. One advantage over the prior art is that no mechanical connection is required between the stop device and a fixing device of the steering column or another manual actuating element. Thus release of the additional adjustment travel beyond the stop in the event of a crash is reliably guaranteed, independently of actuation of a fixing device or similar. Thus it is ensured that, in the event of a crash, the stop device is released even if the fixing device has not been fixed or not correctly fixed manually. Also, it is practically excluded that the wear resulting from frequent actuation of the fixing device detracts from the function of the stop device because, according to the invention, the stop device is actually actuated only in a crash. Accordingly, the invention increases the operating and functional safety of the stop device, which directly benefits vehicle safety.

At least one actuation body, with a degree of freedom of movement in the direction of travel of the vehicle, is mounted movably in the stop device according to the invention. Preferably, the actuation body is mounted movably in the direction of the longitudinal axis of the steering column, which at least with one direction component points forward in the direction of travel. In the event of a crash, the mass inertia causes an inertia force to act on the actuation body, wherein said inertia force is directed forward in the direction of travel relative to the vehicle body and is proportional to the acceleration occurring and to the mass of the actuation body. At least a part component of this inertia force is transferred directly or indirectly from the actuation body as an actuating force; either this is transferred directly onto the stop element, or it indirectly activates an actuating device for moving the stop element out of the blocking position into the release position. Accordingly, in the event of a crash, the stop device is released automatically without prior manual actuation or operation being required. Since the stop device is actuated exclusively in the event of a crash, no actuation can occur due to wear resulting from frequent actuation.

The inertia force acting on the actuation body in the direction of travel corresponds to the product of the acceleration occurring in the crash and the mass of the actuation body. In order for the inertia force as an actuating force to be sufficient for reliable actuation of the stop device, accordingly a sufficiently large mass of the actuation body is provided. In a crash, significantly higher acceleration forces occur than on deceleration of the vehicle in normal operation. Thus the mass of the actuation body may be configured so that this overcomes the existing adhesion friction under the inertia force which acts only in a crash and is translated into movement. On deceleration of the vehicle in normal mode, for example on an emergency braking, the inertia forces of the actuation body are too low, so the actuation body remains in its original position and the stop device remains in its blocking position.

It may be provided that the stop device comprises a gear mechanism. The gear mechanism may be arranged between the actuation body and the stop element, and allows a targeted, predefined transmission of the inertia force occurring in a crash as an actuating force which is transmitted, with a defined direction and size, by the actuation body directly or indirectly onto the stop element, or which activates or triggers the actuation device, which in turn causes a movement of the stop element out of the blocking position into the release position. For example, a force translation may be provided in order to amplify the inertia force, so that the stop element is also released reliably by a relatively small mass of the actuation body.

It may furthermore be advantageous that the gear mechanism is configured as a deflection gear which converts a movement of the actuation body in a first movement direction, for example in the direction of the longitudinal axis or in the direction of travel, or releases a movement of the stop element in a second movement direction which is different from the first movement direction, for example transversely to the direction of the longitudinal axis. In this way, the direction of the inertia force as an actuating force, which is defined in principle by the direction of travel in a crash, is converted into a different movement of the stop element relative to the support unit. Thus for example, a movement of the actuation body triggered by the inertia force, with a component parallel to the longitudinal axis, can be converted into a movement of the stop element transversely to the longitudinal axis, via which the stop element can be brought out of the blocking position into the release position. In this way, the gear mechanism may also be a type of blocking gear which is unlocked or released by the movement of the actuating element in a crash, so that a movement of the stop element into the release position is possible. Such a deflection gear may for example be implemented as a wedge gear with an oblique plane, a lever gear or rolling gear mechanism.

The deflection gear mechanism may be configured to transmit the inertia force, as an actuating force acting on the actuation body, to the stop element with a different direction, or release the movement of the stop element by another source of force. In some cases, the deflection gear may also have a force translation in order to transmit the inertia force as an actuating force with a modified amount, for example to increase the force exerted directly or indirectly on the stop element.

It may preferably be provided that, in the blocking position, the stop element protrudes relative to the support unit transversely to the longitudinal axis into a movement space of the adjustment unit. For length adjustment, the adjustment unit is moved along the longitudinal axis relative to the support unit and thus passes through a passage space corresponding to its cross-sectional profile, namely the movement space. A stop element protruding into this movement space blocks the free movement space at least partially, so that the adjustment unit is moved with at least one counter stop surface in the longitudinal direction towards a stop face on the stop element until it makes contact therewith, i.e. hits this. Thus a stop position in the height of the stop element is defined, in which the movement of the adjustment unit is limited in the longitudinal direction relative to the support unit. The stop face on the stop element, and the corresponding counter stop face on the adjustment unit, may be configured as surface portions which extend transversely to the longitudinal axis and hence, viewed in the direction of the longitudinal axis, overlap to form a stop region. Preferably, the stop element comprises a stop damper. The stop damper may be composed of an elastomer or a plastic. The stop may thus be damped so as to reduce disruptive noise on impact.

In order for the stop device to be able to be brought into the blocking position or release position, it is advantageous that the stop element is mounted movably transversely to the longitudinal axis. In this way, for setting the blocking position, the stop element may protrude substantially vertically into the movement space of the adjustment unit, and for release move transversely to the longitudinal axis so that it no longer protrudes into the movement space of the adjustment unit, and the adjustment unit can be moved further forward in the direction of the longitudinal axis beyond the position of the stop element. The term "substantially vertically" also includes a deviation of ±10° from the vertical arrangement.

It may be provided that the actuation body is guided on the support unit along a defined movement track. The movement track is provided by a guide device which conducts and limits the possible movement of the actuation body under the effect of the inertia force in a crash. A movement track may for example comprise a linear guide along which the actuation body can move. The linear guide may have straight or, additionally or alternatively, curved guide portions so that the actuation body can be moved in corresponding directions. A guide device may, alternatively or additionally, comprise rotary or pivot bearings so that in the event of a crash, the actuation body executes a corresponding rotary or pivot movement. By guiding the actuation body along a defined track, the actuating force derived from the inertia force may be optimally transmitted to the stop element or an actuating device for the stop element.

Preferably, the stop device may have a guide housing. The actuation body may be arranged in the guide housing. The guide housing may be arranged on the support unit and at least partially surround the actuation body and protect it from external influences. Further functional elements of the stop device may also be arranged in the guide housing, for example the stop element and/or a gear mechanism or similar. In this way, a possible deterioration in function, for example from contamination and penetrating moisture, may effectively be excluded, in particular if the guide housing is configured so as to be sealed.

The guide housing may preferably have a guide device for the actuation body which defines or provides a movement track for the guide body. This may for example comprise a guide track or another form of movable mounting for the actuation body which causes a defined movement of the actuation body under the influence of the inertia force acting in a crash.

It may be provided that the actuation body is mounted on at least one roller body. In this way, for example, a ball or roller guide may be implemented, for example a linear bearing with needle rollers which forms a smooth running, linear guide for the actuation body. Differently formed guide devices on roller bearings, with straight or curved guide faces, may also be provided.

The actuation body may at least partially be coated with a friction-reducing slip coating. Preferably, the actuation body is completely coated with a friction-reducing slip coating. Such a slip coating may be formed for example by a plastic coating, e.g. a PTFE coating, which is applied externally at least in part regions. Such a coating may either be arranged on the actuation body or alternatively on a surface of a guide track along which the actuation body slides, or also on the actuation body and the guide track. This reduces the friction forces occurring between the actuation body and the guide track, and guarantees a smooth and secure movement of the actuation body on the guide track, which may be formed as a slip guide or track, under the influence of the inertia force acting in a crash. In this way, a functionally reliable structure of the stop device may be provided at relatively little cost.

An advantageous embodiment of the invention provides that the stop device comprises an energy storage device and a trigger device, wherein the energy storage device is actively connected to the stop element and the trigger device is actively connected to the actuation body. In the event of a crash, the trigger device is actuated and triggered by the inertia force of the actuation body. This allows an energy transfer from the energy storage device to the stop element, for example by releasing the movement of the stop element, so that due to the energy stored in the energy storage device, the stop element can be moved out of the blocking position into the release position. Consequently, the inertia force occurring in a crash is not used directly to move the stop element, but the inertia force of the actuation body indirectly causes the actuation of an external actuating force on the stop element. In other words, according to the invention, the actuation body driven by the inertia force is used only to engage or release an actuating device of the stop device which is driven by the energy stored in the energy storage device.

An advantage of the latter embodiment is that in principle, due to the energy storage device, a sufficient quantity of energy is available at all times to reliably bring the stop element into the release position. In the event of a crash, the actuation body need only apply a relatively small force in order to release or enable the energy transmission from the energy storage device. Thus the actuation body may be configured relatively small and lightweight, wherein simultaneously a high function reliability of the stop device in the event of a crash remains guaranteed.

The energy storage device may have a pretension device which, in the blocking position, elastically pretensions the stop element in the direction of the release position. The pretension device may for example comprise a spring element which, in the blocking position, exerts a spring force on the stop element which is directed towards the release position of the stop element. In an advantageous refinement, it may be provided that the spring element and the stop element are configured integrally. In this embodiment, in normal operation the stop device is in the blocking position, wherein the adjustment travel of the adjustment unit relative to the support unit is limited by the stop element, i.e. the displacement of the adjustment unit forward relative to the direction of travel is blocked in the stop position. The pretension force exerted by the energy storage device, here the pretension device, for example the spring force exerted by spring element which aims to move the stop element into the release position, is supported in normal operating state by the trigger device so that the stop element is held securely in the blocking position. In the event of a crash, the trigger device is triggered by the actuation body so that then the stop element can move, under the influence spring force, out of the blocking position into the release position. The trigger device may be formed by a relatively simple catch mechanism, for example a blocking catch which is moved by the actuation body in order to allow the movement of the stop element into the release position. Release in the event of a crash is thus reliable.

Preferably, the steering column comprises a clamping device which, in the fixing position, fixes the adjustment unit relative to the support unit in normal mode, and in the release position allows an adjustment of the adjustment unit relative to the support unit, at least in the longitudinal direction. The longitudinal adjustability is implemented in that the adjustment unit can be adjusted telescopically in the longitudinal direction relative to the support unit, and fixed in different length positions by means of a releasable clamping device, i.e. fixed releasably. The clamping device, also called a securing device, acts on the adjustment unit held by the support unit, wherein when the clamping device is in the open state—also called the release position or open position—a displacement of the adjustment unit is possible in the length direction relative to the support unit in order to set the steering wheel position, and in the closed state—also called the fixing position or closed position—the adjustment unit is clamped to the support unit and the steering wheel position is fixed under the mechanical loads to be expected in normal driving operation. The clamping device may be operated by a manual control lever or by a motorized drive.

In an advantageous embodiment of the invention, an energy absorption device is arranged between the adjustment unit and the support unit. This is an effective measure for improving occupant safety in a vehicle collision, known as a crash or vehicle frontal impact, in which the driver hits the steering wheel at high speed. In detail, it is known to configure the steering column so as to be collapsible in the longitudinal direction even when the clamping device is in the fixing position, when a high force is exerted on the steering wheel which exceeds a limit value that only occurs in a crash. In order to allow controlled braking of a body hitting the steering wheel, an energy absorption device is coupled between the support unit and the adjustment unit, which in normal operation are clamped together and fixed by the clamping device but are pushed together in a crash. This energy absorption device converts the introduced kinetic energy into plastic deformation of an energy absorption element, for example by tearing of a tear tab or bending of an elongated bending element, such as a bending wire or bending strip, or by widening of a slot by means of a bolt, or by the expansion of a metal strip, or by removal of a splinter by means of a plane. With the stop device configured according to the invention, in the event of a crash, the movement travel in the direction of the longitudinal axis which is necessary for energy absorption is released, in that the stop element is brought from the blocking position into the release position solely by the inertia forces then acting. The additional movement travel for the energy absorption device is then also available when the adjustment unit is maximally retracted into the support unit and hence lies on the stop element. Thus occupant safety is increased.

FIGS. 1 to 4 show a steering column 1 which has an adjustment unit 2, with a casing tube 21 in which a steering spindle 22 is mounted so as to be rotatable about the longitudinal axis L. A steering wheel (not shown) may be attached to a portion 23 of the steering spindle 22 which is at the rear in the direction of travel.

The adjustment unit 2 is held in a support unit 3 which in turn is attached to a console unit 4 that can be attached to a body of the motor vehicle (not shown).

The support unit 3 comprises a recess with a free movement space 35 in which the adjustment unit 2 is mounted, wherein the support unit 3 comprises side portions 31 and 32, between which a slot 33 extends in the direction of the longitudinal axis L and on which a clamping force can be exerted transversely to the longitudinal axis L by a clamping device 5, whereby said portions may be pressed against each other and hence the slot 33 narrowed. In this way, the casing tube 21 of the adjustment unit 2, arranged in support unit 3, may be clamped in the support unit 3 in the closed position (fixing position) of the clamping device 5, whereas the support unit 3 exerts no clamping force on the casing tube 21 in the open position (release position) so that the adjustment unit 2 can be adjusted in order to set the steering wheel position in the direction of the longitudinal axis L, i.e. in the length direction. Furthermore, in the open position, the adjustment unit 2 can be pivoted relative to the console unit 4 about a pivot axis 44. Thus a height adjustability of the steering column 1 may be achieved.

The clamping device 5 has a clamping shaft 51 as an actuating element which is mounted so as to be rotatable about its rotation axis S in the opposing side portions 31, 32 of the support unit 3. A clamping lever 54 is mounted rotationally fixedly on the clamping shaft 51 for manual rotation of the clamping shaft 51. As an alternative to the clamping lever 54, a motorized drive may also be used.

With the clamping device 5 in the release position, the adjustment unit 2 can be moved forward and back in the movement space 35, which extends substantially coaxially to the longitudinal axis L inside the support unit 3, parallel to the longitudinal axis L, i.e. retracted or extended for adjusting the steering wheel position. The adjustment unit 2 here moves with a slight radial play through the free, open passage cross-section of the support unit 3.

A stop device 9 according to the invention is arranged on the support unit 3.

Figure 3:
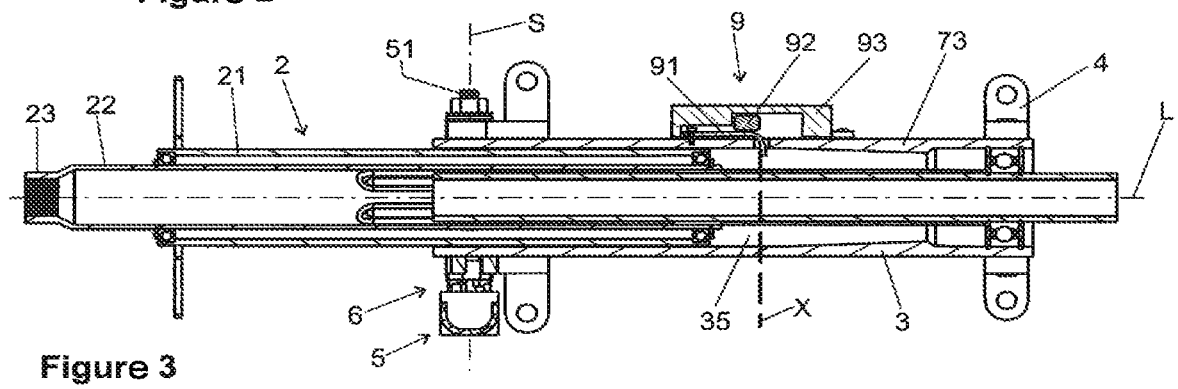
FIG. 3 is a longitudinal sectional view through the steering column of FIG. 1 or 2 in a blocking position of an example stop device.
Figure 4:
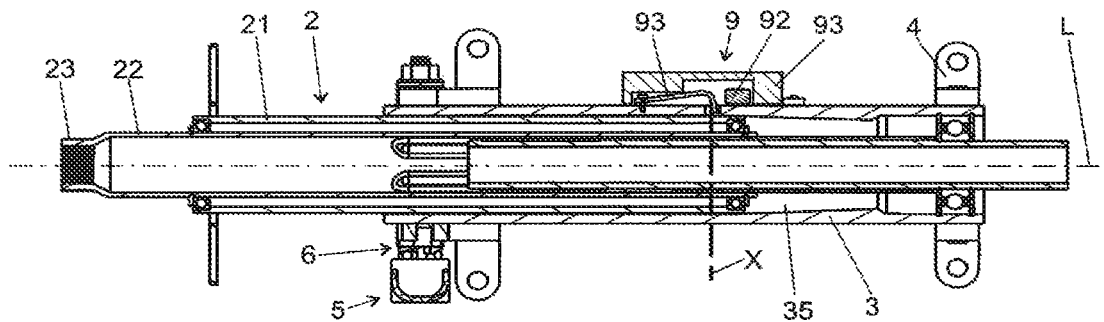
FIG. 4 is a longitudinal sectional view through the example steering column of FIG. 1 or 2 in a release position of the example stop device.

FIG. 3 and FIG. 4 show a longitudinal section through the steering column 1 along the longitudinal axis L, in a view from above. A stop position X indicates a length position on the longitudinal axis L relative to the support unit 3, which position is predefined by the stop device 9, as will be explained in more detail below. FIG. 3 here shows the steering column 1 in an adjustment position in normal operation, in which the adjustment unit 2 is pushed forward into the support unit 3 into the support unit 3, i.e. to the right in the drawing, but not as far as the stop position X. FIG. 4 illustrates a situation after a crash, in which the adjustment unit 2 has retracted further forward into the support unit 3 beyond the stop position X, i.e. to the right in the drawing beyond the stop position X.

A stop device 9 in various embodiments shown enlarged in FIGS. 5 to 10, wherein function elements of similar working principle carry the same reference signs.

In all embodiments shown, the stop device 9 comprises a stop element 91, an actuation body 92 and a guide housing 93.

The guide housing 93 is attached to the outside of the support unit 3 by means of a fixing element 931, and is preferably formed as a closed box so that the components situated therein are protected and enclosed at least dust-tightly.

A guide track 94 is formed in the guide housing 93; the actuation body 92 lies on said track and, in a crash, can be moved along this in the direction of the longitudinal axis L under the effect of inertia forces acting towards the front, as indicated by the arrow pointing forward, i.e. to the right in the drawing.

In the embodiments according to FIGS. 5 to 8, the stop element 91 is formed as a substantially L-shaped bracket which is attached by one leg to the outside of the support unit 3 by means of a fixing element 911. The other leg of the stop element 91 forms a blocking portion 912 which, in the blocking position shown in FIGS. 5, 7 and 8, extends through a radial opening 36 into the support unit 3. The blocking portion 912 protrudes inwardly into the movement space 35 in which the adjustment unit 2 is mounted displaceably for adjustment, as indicated by the arrow. The blocking portion 912 has a stop face 913 arranged on its side pointing towards the rear relative to the longitudinal axis. The stop face 913 defines a stop position X in the longitudinal direction, and viewed in the direction of the longitudinal axis L lies opposite a counter stop face 213 arranged on the front end face of the adjustment unit 2.

The function principle of the stop device 9, in the blocking position shown in FIGS. 5, 7, 8 and 9, is that the adjustment travel of the adjustment unit 2 is blocked, and hence limited, at the stop position X by the blocking portion 912 protruding into the movement space 35. The adjustment unit 2 can only move so far forward, i.e. be retracted in order to shorten the steering column 1, until its counter stop face 213 meets the stop face 913 of the stop element 91 in the stop position X.

Figure 5:
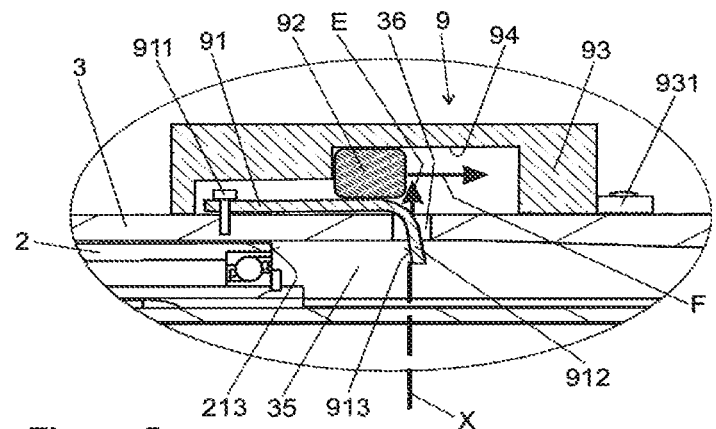
FIG. 5 is a longitudinal sectional view through an example stop device in a blocking position.
Figure 6:
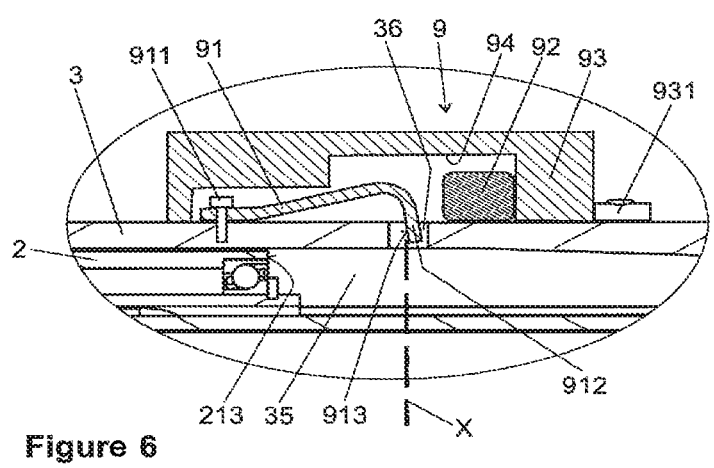
FIG. 6 is a longitudinal sectional view through the example stop device of FIG. 5 in a release position.

In the embodiment shown in FIGS. 5 to 8, the stop element 91 is formed as a spring element, more precisely a leaf spring, the relaxed rest state of which is shown in FIG. 6. It can be seen from this that the stop element 91 with its free end protrudes so far from the outside of the support unit 3 that the blocking portion 912 is situated outside the movement space 35, and the stop face 913 does not lie opposite the counter stop face 213. This setting corresponds to the release position which exists before installation and after triggering in a crash, as will be explained below. In order to bring the stop device 9 into the operating state, namely into the blocking position shown in FIGS. 5, 7 and 8, the stop element 91 is bent elastically against the spring force E, directed outwardly relative to the support unit 3 in the region of the blocking portion 912, until the blocking portion 912 protrudes inwardly into the movement space 35 through the opening 36 in the support unit 3, whereby the blocking position is achieved.

Consequently, in the blocking position, the stop element 91 presses with spring force E against the actuation body 92 which in turn is supported against the guide track 94. In other words, the stop element 91, formed as a spring element and clamped in the blocking position, forms an energy storage device which, via the stored spring energy, pretensions the stop element 91 out of the blocking position in the direction of the release position shown in FIG. 6. The actuation body 92 serves as a blocking or catch element which only allows the transition of the stop element from the blocking to the release position when it is removed from between the top side of the stop element 91 and the guide track 94. Thus a trigger device is implemented which is actively connected to the actuation body.

In the event of a crash, because of the mass inertia, an inertia force F which is oriented forward relative to the direction of travel acts on the actuation body 92. In FIG. 5, the force component of this inertia force F which is oriented parallel to the longitudinal axis L is indicated diagrammatically by the arrow. The amount of the inertia force F corresponds to the product of the mass of the actuation body 92 and the acceleration on abrupt braking of the vehicle in a crash.

Under the effect of the inertia force F, the actuation body 92 is moved forward, i.e. to the right in the drawing, from the blocking position shown in FIG. 5 in which it locks the stop element 91 in the blocking position. In doing so, it slides forward along the guide track 94 and is removed from the space between the top side of the stop element 91 and the guide track 94. As a result, the stop element 91 moves outward away from the support unit 3, and its blocking portion 912 moves outward, under the influence of spring pretension, partly out of the opening 36 and onto the guide track 94. This removes the stop face 913 of the blocking portion 912 of the stop element 91 from the movement space 35. This corresponds to the release position of the stop element 91 of the stop device 9 shown in FIG. 6. Consequently, the adjustment unit 2 with its front counter stop face 213 can move freely forward past the stop position X, parallel to the longitudinal axis L.

Figure 7:
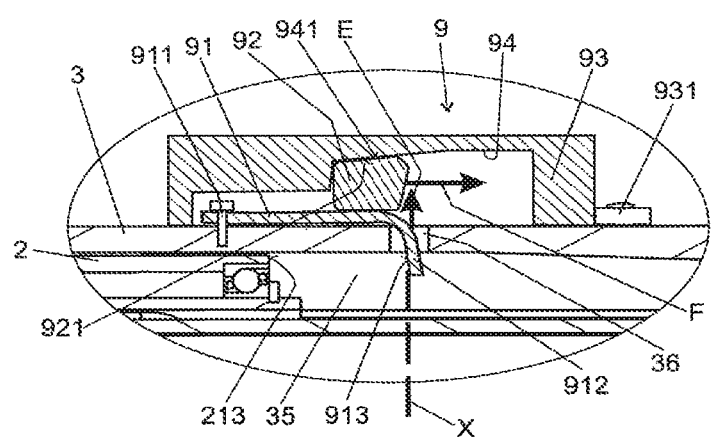
FIG. 7 is a longitudinal sectional view through another example stop device in a blocking position.

The embodiment shown in the blocking position in FIG. 7 substantially corresponds to the embodiment of FIG. 5. One difference is that the guide track 94 has a sloping portion 941. The actuation body 92 also has a sloping top side which, in the blocking position shown, lies on the portion 941. This wedge-shaped design, which widens towards the front in the direction of the longitudinal axis, facilitates the transition to the release position in a crash. As soon as it is triggered, the movement of the actuation body 92 is further supported by the spring force of the stop element.

In order for the actuation body 92 to be able to slide forward with low friction along the guide track 94 and the stop element 91, it may at least partially be provided with a friction-reducing coating, for example made of PTFE (polytetrafluoroethylene) or graphite. In addition or alternatively, the guide track 94 and/or the stop element 91 may also have a friction-reducing coating at least on the contact faces with the actuation body 92.

Figure 8:
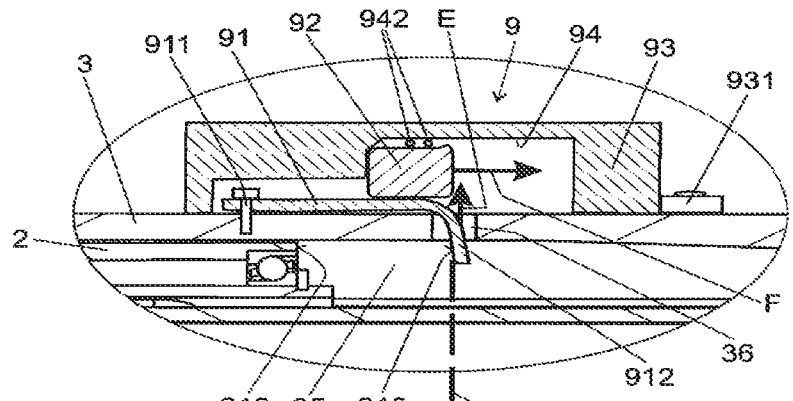
FIG. 8 is a longitudinal sectional view through still another example stop device in a blocking position.

In the third embodiment shown in FIG. 8, the adhesion and slip friction between the actuation body 92 and the guide track 94 is reduced by the arrangement of roller bodies 942, for example needle rollers, between the actuation body 92 and the guide track 94. These form a reliable roller-mounted linear guide, with particularly low friction, for movement of the actuation body 92 in a crash.

Figure 9:
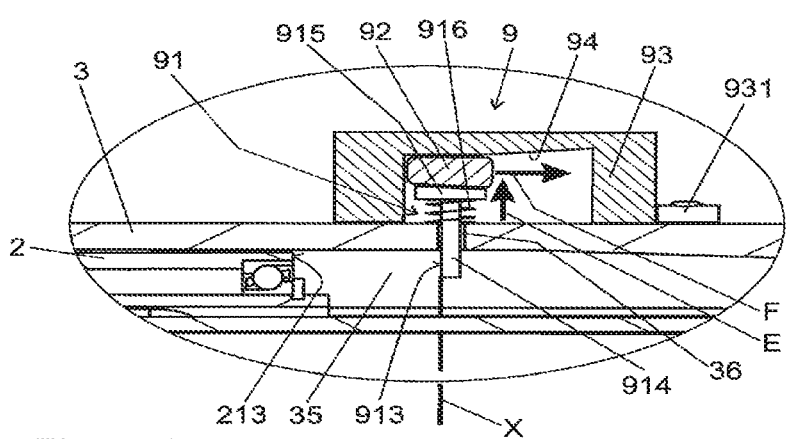
FIG. 9 is a longitudinal sectional view through another example stop device in a blocking position.
Figure 10:
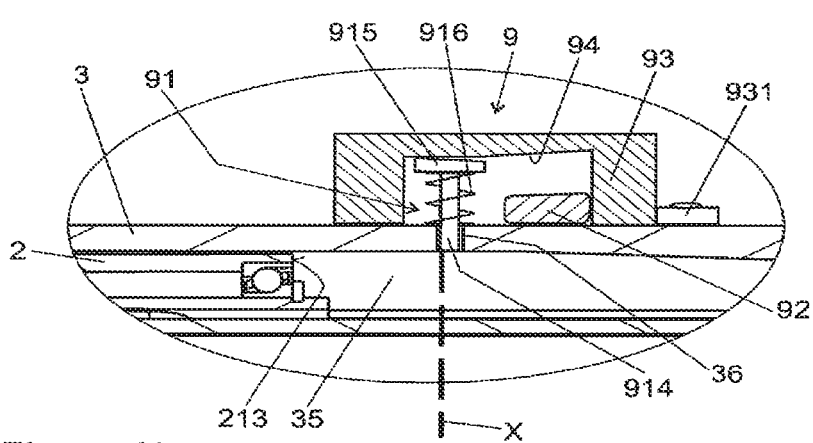
FIG. 10 is a longitudinal sectional view through the example stop device of FIG. 9 in a release position.
Figure 11:
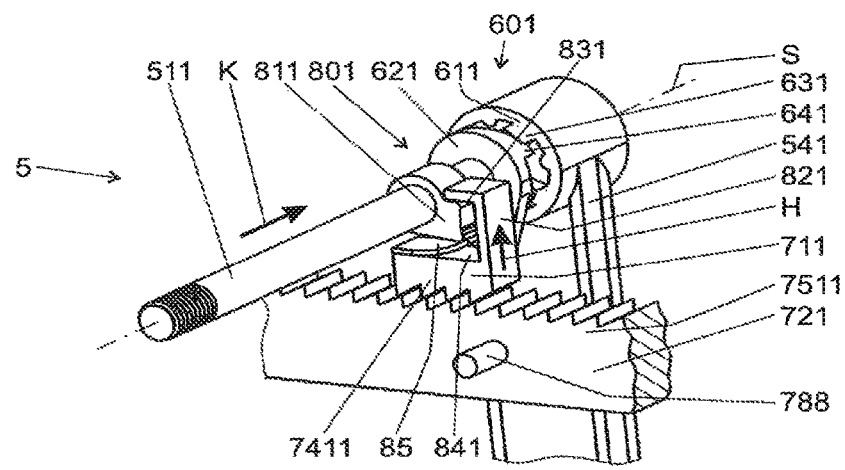
FIG. 11 is a partial detail view of an example crash device on the example steering column according to FIG. 1.
Figure 12:
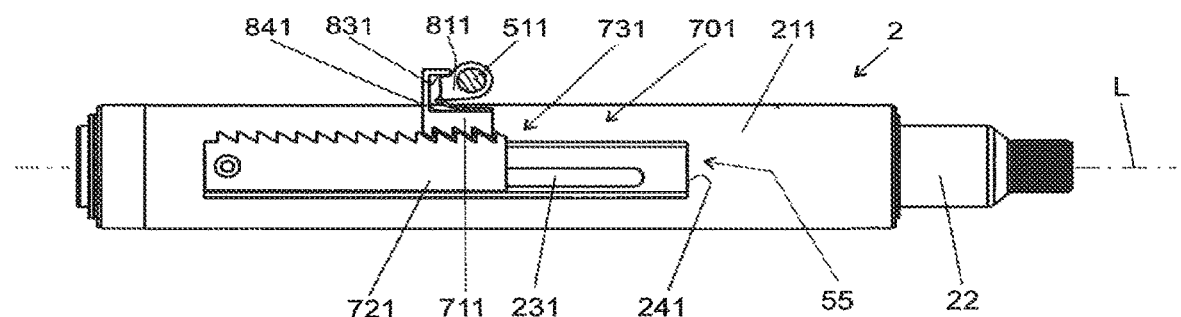
FIG. 12 is a diagrammatic side view through an example adjustment unit for a steering column with crash activation according to FIG. 10.
Figure 13:
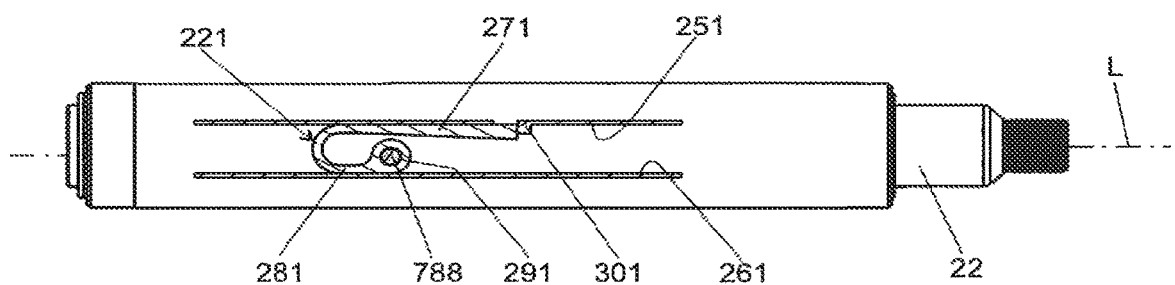
FIG. 13 is a longitudinal sectional view through the example adjustment unit according to FIG. 12 before a crash.
Figure 14:
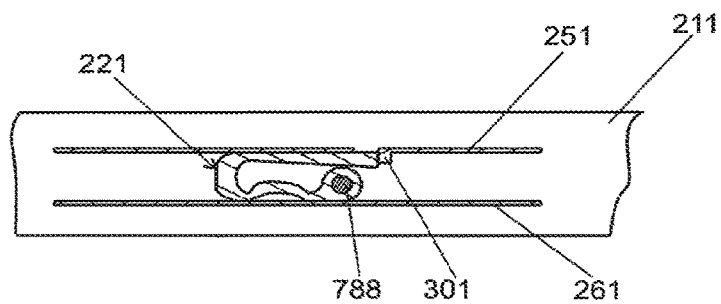
FIG. 14 is a longitudinal sectional view through the example adjustment unit according to FIG. 12 after a crash.

FIGS. 9 and 10 show a further embodiment in which the stop element 9 comprises a stop pin 914 which can be passed displaceably through the opening 36 in the support unit 3 transversely to the longitudinal direction. On its inner end which protrudes into the movement space 35 in the blocking position shown in FIG. 9, a stop face 913 is formed, the function of which is the same as in the above-mentioned embodiments. The stop face 913 may comprise a damping element (not shown) which damps the impact of the counter stop face on the stop face. Such a damping element may be configured as a rubber buffer or plastic element. At the other end, the stop pin 914 has a head 915. A spring element 916, which is inserted under pretension between the underside of the head 915 and the outside of the support unit 3, and in the example shown is a coil spring arranged coaxially to the stop pin 914, exerts an outwardly directed spring force E on the stop element 9. As already explained in relation to FIG. 5, the spring element 916 also constitutes an energy store for moving the stop element 9 out of the blocking position shown in FIG. 9 into the release position shown in FIG. 10.

The device is triggered in that, under the influence of the inertia force F occurring in a crash, the actuation body 92 is moved forward and out from between the head 915 and the guide track 94, wherein the stop device 9 is triggered and the stop element 91 is moved into the release position, shown in FIG. 10, under the influence of the spring energy stored in the spring element 916.

In the event of a crash, with the stop device 9 according to the invention alone, the stop element 91 is brought from the blocking position into the release position due to the inertia forces then acting. Thus the adjustment unit 2 may be moved, i.e. retracted, further forward beyond the stop position relative to the support unit 3, parallel to the longitudinal axis.

Preferably, the additional adjustment travel released by the stop device 9 in a crash is used deliberately to transfer the kinetic energy of a body hitting the steering column into an energy absorption device.

FIGS. 9 to 12 show an energy absorption device 731 with a crash activation by a manually operated clamping lever 541 of a clamping device 5 with a clamping gear mechanism 601.

In the embodiment shown, the clamping gear 601 comprises a first cam disc 611 connected fixedly to the clamping lever 541 (corresponds to the clamping lever 54) and the clamping shaft 511 (corresponds to the clamping shaft 51), and a second cam disc 621 connected to the side part of the support unit 3. The cam discs 611 and 621 have cams 631 and 641 which are oriented axially against each other and slide on each other. To fix the adjustment unit 201 (corresponds to the adjustment unit 2 in the previous figures), the clamping shaft 511 is turned by means of the clamping lever 541 so that the cams 631 and 641 are moved out of an open position, in which the one cam 631, 641 of the one cam disc 611, 621 engages in a respective depression between the cams 641, 631 of the respective other cam disc 621, 611, into a fixing position in which the cams 631, 641 lie with their protrusions axially against each other.

In the open position or release position, the toothing 7511 of the toothed block 711 is completely lifted off the toothing 7411 of the toothed plate 721 in the lift direction H, i.e. released, whereby the crash device 701 is deactivated. This release position of the lifting gear 801 at the same time corresponds to the release position of the clamping gear 601, so that the adjustment unit 201 can be adjusted in longitudinal direction L relative to the support unit 3.

The crash device 701 comprises the catch part 711 in the form of a toothed block 711, and the engagement part 721 in the form of the toothed plate 721. The toothed plate 721 is connected to the casing tube 211 (corresponds to the casing tube 21) via an energy absorption device 731, and has form-fit elements configured as toothing 7511 on a side face which is oriented parallel to the longitudinal axis L and parallel to the rotation axis S. The toothed block 711 has a toothing 7411, which is opposite and corresponds to the toothing 7511, and which can engage by form fit in the toothing 7511. Preferably, the teeth of the toothing 7411, 7511 have a sawtooth-like cross-section. The toothed plate 711 has a carrier 788 extending parallel to the rotation axis S and facing the casing tube 211.

The toothed plate 721 is connected to a bending wire or strip 221 arranged in a housing which is formed by the rail 55 of U-shaped cross-section in conjunction with a portion of the casing tube 211. For this, the engagement part 721 comprises the carrier 788 formed by a pin which protrudes through a slot 231 in the wall 241 of the rail 55. The slot 231 extends in the direction of the longitudinal axis L. In addition to the wall 241, the rail also has a side leg 251 and a side leg 261, wherein each of the side legs 251, 261 extends substantially parallel to the longitudinal axis L and to the rotation axis S. The term "substantially parallel" includes a deviation within a spatial angle of up to ±10°.

Via the carrier 788 protruding through the slot 231, the engagement part 721 can be carried displaceably further by the adjustment unit 201 in the longitudinal direction thereof. An arrangement of the carrier on the bending wire or strip 221 is also conceivable and possible. The engagement part 721 may also be guided displaceably by the adjustment unit 2 in a different manner.

The bending wire or strip 221 has legs 271, 281 which are connected via a 180° bend and extend substantially in the direction of the longitudinal axis L. The two legs 271, 281 lie on opposite sides of the housing on the inner faces of the side legs 251, 261 of the rail 55. The rolling bending radius of the bending wire or strip 221 is thus limited and defined on deformation in a crash, in particular during a progressive bending.

To connect the toothed plate 721 to the bending wire or strip 221, the pin-like carrier 788 protrudes into a bore 291 in the leg 281. Other connections of the toothed plate 721 with the bending wire or strip 221 are conceivable and possible.

The other leg 271 of the bending wire or strip 221 which is not connected to the toothed plate 721 rests on a stop 301 of the rail 55, by which it is carried in the direction of the longitudinal axis L on a displacement of the adjustment unit 201 relative to the support unit 302. Other connections of the leg 271 to the housing in which the bending wire or strip 221 is arranged, in order to carry the leg 271 in the direction of the longitudinal axis L in a crash, are conceivable and possible.

If a force exceeding a limit value acts in the direction of the longitudinal axis L (=crash), the adjustment unit 201 is moved in the direction of the longitudinal axis L (in a direction pointing towards the vehicle front) relative to the support unit 302 (corresponds to the support unit 3) which is fixedly connected to the vehicle, wherein telescopic portions of the steering spindle 22 slide into each other and the adjustment unit 201 shifts relative to the toothed plate 721 held by the toothed block 711, and hence the bending wire or bending strip 221 is deformed. This deformation in particular comprises a change of location of the bend between the legs 271, 281. Energy is absorbed by this plastic deformation of the bending wire or strip 221.

In the exemplary embodiment shown, the thickness of the leg 271 increases towards its free end, for example in a wedge shape. Hence, and because the bending wire or strip 221 is blocked between the end walls of the housing formed by the side legs 251, 261, on an increasing shift of the adjustment unit 201 relative to the support unit of the steering column, finally the portion 281 (in the region in which it is provided with the bore 291) meets the thicker region of the leg 271, whereby additional deformation work occurs due to compression.

Because of the geometric formation of the bending wire or strip 221, a desired curve for energy absorption can be achieved. For this, the cross-section of the leg 271 may be configured with a predefined development over its length in relation to its surface area and/or in relation to its contour.

LIST OF REFERENCE SIGNS

1 Steering column
2, 201, 202 Adjustment unit
21, 211 Casing tube
213 Counter stop face
22 Steering spindle
221 Bending strip/bending wire
23 Portion
231 Slot
241 Wall
251, 261 Side leg
271, 281 Leg
291 Bore
3, 302 Support unit
301 Stop
31, 32 Side portions
33 Slot
34, 342 Guide
35 Movement space
36 Opening
4 Console unit
5 Clamping device
51, 511, 512 Clamping shaft
54, 541 Clamping lever
55 Rail
6, 601 Clamping gear
61, 62, 611, 621 Cam disc
63, 64, 631, 641 Cam
7, 701 Crash device
71, 711, 712 Toothed block (catch part)
72, 721, 722 Toothed plate (engagement part)
73, 731 Energy absorption device
74, 75, 7411, 7412, Toothing (form-fit element)
7511, 7512 Toothing (form-fit element)
741, 751 Teeth
76 Longitudinal groove
788 Carrier
8, 801, 802 Lift gear
81, 811, 812 Cam
82, 821, 822 Coupling portion
83, 831, 832 Lifting face
84, 841, 842 Pressure face
85 Leaf spring (spring element)
9 Stop device
91 Stop element
911 Fixing element
912 Blocking portion
913 Stop face
914 Stop pin
915 Head
916 Spring element
92 Actuation body
921 Top side
93 Guide housing
94 Guide track
941 Portion
942 Roller body
K Clamping stroke
L Longitudinal axis
S Rotary axis
H Lift direction
X Stop position
F Inertia force
E Spring force

What is claimed is:

1. A steering column for a motor vehicle comprising:
an adjustment unit with a steering spindle mounted rotatably about a longitudinal axis of the steering spindle in a casing tube;
a support unit that is connectable to a body of the motor vehicle, the adjustment unit being mountable in the support unit so as to be adjustable in a direction of the longitudinal axis; and
a stop device with a movably mounted stop element that is positionable in a blocking position and in a release position, wherein in the blocking position the stop element limits adjustment travel of the adjustment unit relative to the support unit, wherein in the release position the stop element permits adjustability in the direction of the longitudinal axis beyond the adjustment travel that is limited in the blocking position, wherein the stop device includes an actuation body that has an inert mass, that is actively connected to the stop element, and that is mounted movably relative to the support unit,
wherein in a crash event the mass inertia of the actuation body causes the actuation body to interact with the stop element to move the stop element from the blocking position into the release position.

2. The steering column of claim 1 wherein the stop device comprises a gear mechanism.

3. The steering column of claim 2 wherein the gear mechanism is configured as a deflection gear that converts a movement component of the actuation body parallel to the longitudinal axis into a movement of the stop element transversely to the longitudinal axis.

4. The steering column of claim 1 wherein in the blocking position the stop element protrudes relative to the support unit transversely to the longitudinal axis into a movement space of the adjustment unit.

5. The steering column of claim 1 wherein the adjustment unit has a counter stop face, which in the blocking position is configured to make contact against a stop face of the stop element in a forward longitudinal direction.

6. The steering column of claim 1 wherein the actuation body is guided along a guide track on the support unit.

7. The steering column of claim 1 wherein the stop device comprises a guide housing.

8. The steering column of claim 1 wherein the actuation body is mounted on a roller body.

9. The steering column of claim 1 wherein the actuation body is at least partially coated with a friction-reducing slip coating.

10. The steering column of claim 1 wherein the stop device comprises an energy storage device and a trigger device, wherein the energy storage device is actively connected to the stop element and the trigger device is actively connected to the actuation body.

11. The steering column of claim 10 wherein the energy storage device comprises a pretension device, wherein in the blocking position the pretension device elastically pretensions the stop element in a direction of the release position.

12. The steering column of claim 1 wherein an energy absorption device is disposed between the adjustment unit and the support unit.

13. The steering column of claim 1 further comprising a clamping device, wherein in a fixing position the clamping device fixes the adjustment unit relative to the support unit in a normal mode, wherein in a release position the clamping device allows adjustment of the adjustment unit relative to the support unit at least in the direction of the longitudinal axis.

\* \* \* \* \*